United States Patent [19]

Dugge

[11] 4,151,935
[45] May 1, 1979

[54] SAMPLING ASSEMBLY FOR PNEUMATIC OUTLET

[75] Inventor: Richard H. Dugge, St. Louis, Mo.

[73] Assignee: ACF Industries, Incorporated, New York, N.Y.

[21] Appl. No.: 867,848

[22] Filed: Jan. 9, 1978

[51] Int. Cl.² .................. B61D 7/02; B65G 53/40
[52] U.S. Cl. ................................. 222/556; 105/283; 406/131; 406/145; 414/524
[58] Field of Search ............... 222/545, 556; 105/247, 105/250, 280, 283; 214/83.28; 251/299, 300, 305; 302/52

[56] References Cited

U.S. PATENT DOCUMENTS

| 2,769,403 | 11/1956 | Cox | 222/556 X |
|---|---|---|---|
| 3,583,768 | 6/1971 | Korauda | 214/83.28 X |
| 3,876,261 | 4/1975 | Jucius et al. | 302/52 |
| 4,114,785 | 9/1978 | Dugge | 222/545 |

Primary Examiner—Joseph J. Rolla
Attorney, Agent, or Firm—Henry W. Cummings

[57] ABSTRACT

A pair of longitudinally spaced valve elements are provided in a pneumatic outlet. Each valve element includes a body portion, preferably a segment of a circle, including a body portion edge which seats on a body portion valve seat located adjacent the body portion edge, and a moment portion extending eccentrically away from the body portion, which seats on a moment portion valve seat. Each valve element is movable to a sampling position in which the body portion is spaced from the body portion valve seat and the moment portion is spaced from the moment portion valve seat to allow lading for sampling to flow into the discharge conduit. Each valve element includes a pair of operating shafts extending in opposite directions from the valve element, parallel to the discharge conduit, through opposite end walls of the outlet. Operating handles are attached to the operating shafts outside the end walls of the outlet. The discharge conduit end caps are held in place with a pair of large headed bolts which are pivotably mounted on the discharge conduit and which engage at least a portion of the adjacent end cap. The large headed bolts are attached to vertically extending locking members of generally inverted J shape which are rotatably mounted on a side of the discharge conduit. In accordance with the present invention, the lower locking surface on a pair of diagonally spaced inverted J bolts is spaced from its respective operating handle a distance sufficient that if the end cap on the near or sampling end of the outlet is removed, the operating handle on the sampling end may be rotated sufficiently to move the valve member away from its valve seat a distance sufficient to take a sample of lading, without removing the end cap on the opposite end of the discharge conduit.

6 Claims, 7 Drawing Figures

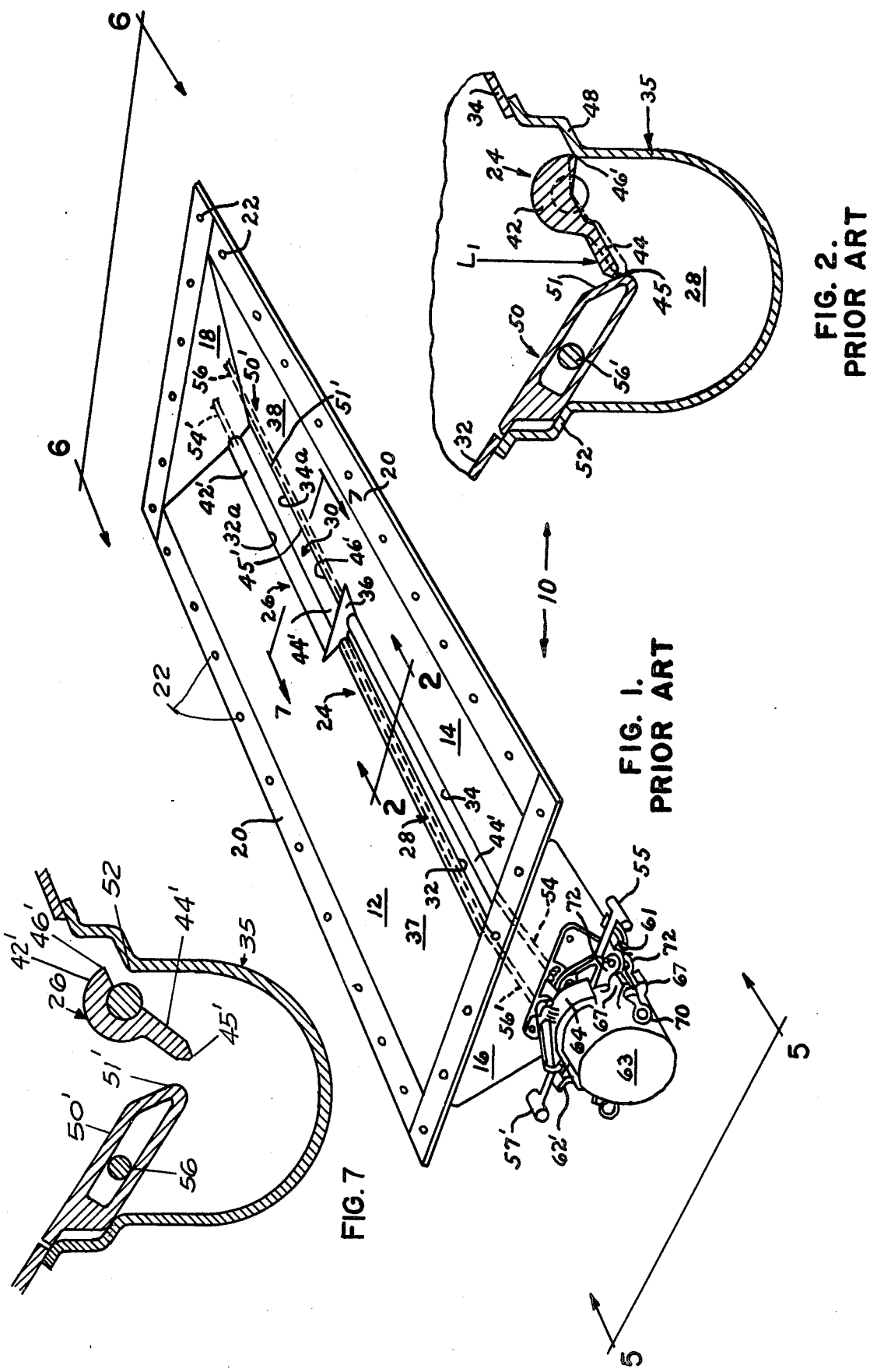

SAMPLING ASSEMBLY FOR PNEUMATIC OUTLET

BACKGROUND OF THE INVENTION

In application Ser. No. 775,892 filed Mar. 9, 1977, now U.S. Pat. No. 4,114,785, a pair of longitudinally spaced valve elements are provided in a pneumatic outlet. As described in greater detail in this application, each valve element includes a body portion, preferably a segment of a circle, including a body portion edge which seats on a body portion valve seat located adjacent the body portion edge. Each valve element further includes a moment portion extending eccentrically and transversely away from the body portion, having a moment portion edge which seats on a moment portion valve seat located adjacent the moment portion edge. The moment portion valve seat is preferably elongated. Each valve element is thus movable to a metering position in which the body portion is spaced a small distance from the body portion valve seat to allow a small amount of lading to flow into the discharge conduit, while the moment portion edge is seated on or located closely adjacent to, the moment portion valve seat. Each valve element is further movable to an open position in which both the body portion edge and the moment portion edge are spaced from their respective valve seats to permit lading to flow through both openings into the discharge conduit. Each valve element has a pair of operating shafts attached thereto extending in opposite directions from the valve elements, parallel to the discharge conduit and passing through opposite end walls of the outlet. Operating handles are attached to the operating shafts outside the respective end walls of the outlet, and extend generally horizontally away from each other.

In Ser. No. 844,666 filed Oct. 25, 1977 the discharge conduit end cap is held in place with a pair of large headed bolts which are pivotably mounted on the discharge conduit and which engage at least a portion of the adjacent end cap. The large headed bolts are attached to vertically extending locking members of generally inverted J shape which are rotatably mounted on a side of the discharge conduit. When the operating handles are in the position which corresponds to the fully closed position of the valve elements, the lower surface of the locking members prevent movement of the respective operating handles and valve elements from moving from the closed position. If a valve element and thus its operating handles are not in the fully closed position, its operating handles will obstruct the path of the respective pivoting locking members, and the large headed bolts located adjacent the locking members cannot be pivoted into position to hold the end caps in closed position.

However in order to take a sample of the lading according to the teachings of both applications Ser. No. 775,892 and Ser. No. 884,666 it is necessary to remove the end caps from both ends of the discharge conduit.

SUMMARY OF THE INVENTION

The object of the present invention is to provide a pneumatic outlet including at least one valve element movable to a sampling position, and including the inverted J hook end cap locking arrangement for the discharge conduit constructed generally according to the teachings of said Ser. No. 844,666, in which a sample of lading can be taken by removing the end cap from only the near end of the discharge conduit.

A pair of longitudinally spaced valve elements are provided in a pneumatic outlet. Each valve element includes a body portion, preferably a segment of a circle, including a body portion edge which seats on a body portion valve seat located adjacent the body portion edge, and a moment portion extending eccentrically away from the body portion which seats on a moment portion valve seat. Each valve element is movable to a sampling position in which the body portion is spaced from the body portion valve seat, and the moment portion is spaced from the moment portion valve seat to allow lading for sampling to flow into the discharge conduit. Each valve element includes a pair of operating shafts extending in opposite directions from the valve elements, parallel to the discharge conduit, through opposite end walls of the outlet. Operating handles are attached to the operating shafts outside the end walls of the outlet. The discharge conduit end caps are held in place with a pair of large headed bolts which are pivotably mounted on the discharge conduit and which engage at least a portion of the adjacent end cap. The large headed bolts are attached to vertically extending locking members of generally inverted J shape which are rotatably mounted on a side of the discharge conduit. In accordance with the present invention, the lower locking surface on a pair of diagonally spaced, inverted J bolts is spaced from its respective operating handle a distance sufficient that if the end cap on the near or sampling end of the outlet is removed, the operating handle on the sampling end may be rotated sufficiently to move the valve member away from its valve seat a distance sufficient to take a sample of the lading, without removing the end cap on the opposite end of the discharge conduit. The sample may be removed from the discharge conduit manually, without attaching a transfer conduit. The spaced locking member on the opposite end of the outlet provides a sampling position stop when the operating handle on the sampling end has been rotated sufficiently far to take a sample.

THE DRAWINGS

FIG. 1 is a perspective view of a prior art hopper outlet constructed according to the teachings of application Ser. No. 775,892 referred to hereinbefore;

FIG. 2 is a sectional view looking in the direction of the arrows along the line 2—2 in FIG. 1;

FIG. 7 is a sectional view looking in the direction of the arrows along the line 7—7 in FIG. 2 illustrating one of the valve elements in the sampling position.

DESCRIPTION OF PREFERRED EMBODIMENT

Figure 6:
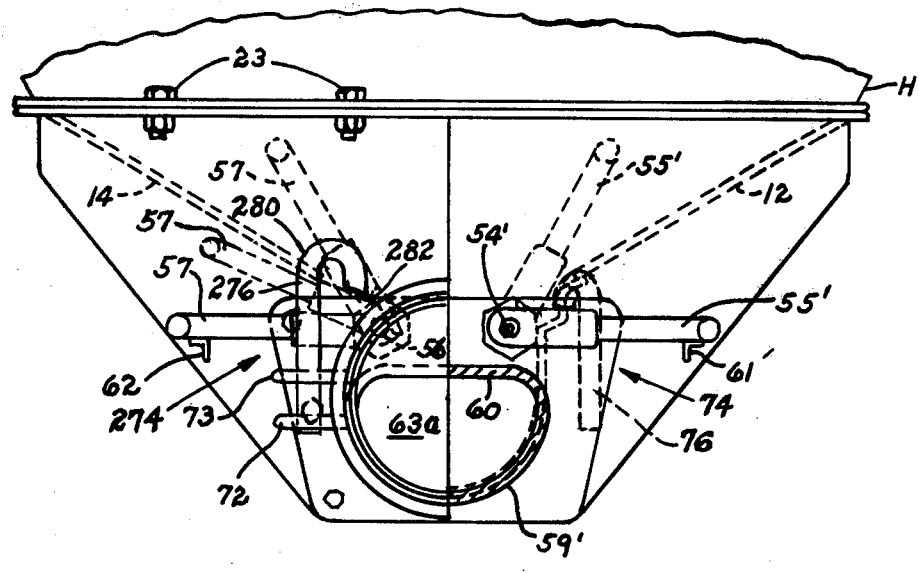
FIG. 6 is an end view looking in the direction of the arrows along the line 6—6 in FIG. 1 with the end cap removed, and illustrating a diagonally opposite locking member spaced above its operating handle for sampling on the opposite end.

A hopper discharge outlet is shown in the drawings at 10. The outlet includes side walls 12 and 14, and end walls 16 and 18. A flange portion 20 is provided having openings 22 to receive fasteners 23 to attach the outlet to a hopper H (FIG. 6).

Longitudinally spaced valve elements 24 and 26 are provided in openings 28 and 30 defined by the lower inner edges 32, 34 and 32a, 34a of side walls 12 and 14. A discharge conduit 35 (FIG. 2) extends longitudinally of the outlet. Opening 30, inner edges 32a and 34a, and valve element 26 are slightly laterally spaced from inner edges 32, 34, opening 28 and valve element 24. A transverse formed plate 36 divides the outlet longitudinally into two compartments 37 and 38.

Valve elements 24 and 26 are described in greater detail in application Ser. No. 775,892 filed Mar. 9, 1977.

Each of the valve elements 24 and 26 are constructed the same, so only one will be described.

Briefly as shown in FIG. 2, valve element 24 includes a body portion 42 which may be a segment of a circle, and a moment portion 44 extending outwardly and eccentrically from the body portion 42. Body portion 42 includes an edge 46 which in closed position seats on a valve seat 48 formed on discharge conduit 35. Moment portion 44 includes a moment portion edge 45 which seats on inclined portion 51 of valve seat 50 also located within opening 28, mounted on shoulder 52 of discharge conduit 35.

Valve element 26 includes a body portion 42' having an edge 46' which seats on shoulder 52; and a moment portion 44' having a moment portion edge 45' which seats on valve seat 50' mounted on shoulder 48.

As is described in greater detail in said Ser. No. 775,892 the lading $L_1$ (FIG. 2) acting on respective moment portions 44 and 44' creates a moment $M_1$ about respective body portions 42, 42' to facilitate moving the valve elements 24 and 26 to the open position for lading flow into discharge conduit 35. Valve elements 24 and 26 are also movable to partly open, metering position described in greater detail in Ser. No. 775,892 and shown in dotted lines in FIG. 2. In this metering position body portion edge 46 is spaced from body portion valve seat 48 a small amount to allow a small amount of lading to pass into discharge tube 35, while moment portion edge 45 remains seated on, or closely adjacent to moment portion valve seat 51. Valve element 26 is movable to a similar metering position with valve body edge 26' spaced from valve seat 52 while moment portion edge 45' remains seated on, or closely adjacent the valve seat 51'.

Each of the valve elements 24 and 26 have shafts attached thereto 54 and 54' which extend through the respective rear end walls 16 and 18; and shafts 56, 56' which extend through formed plate 26 and through hollow valve seats 50, 50' through the respective far end walls 18 and 16.

Figure 5:
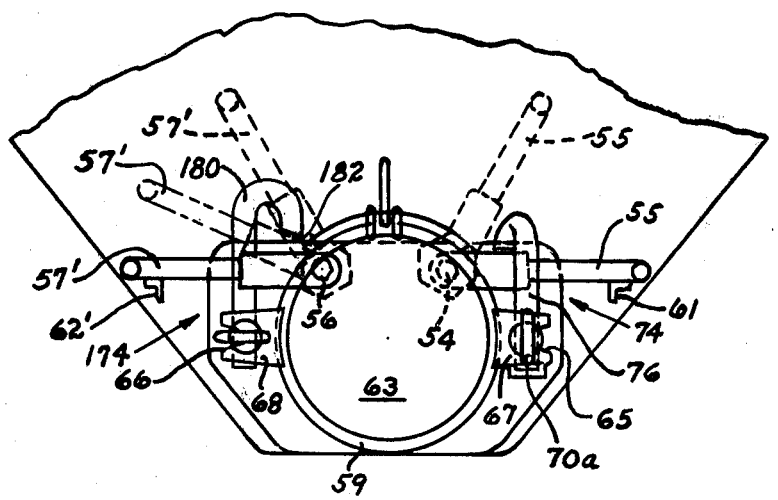
FIG. 5 is an end view looking in the direction of the arrows along the line 5—5 in FIG. 1, and illustrating a locking member spaced above the operating handle for sampling on the opposite end.

Each of the shafts 54, 54', 56 and 56' are provided with operating handles 55, 55' and 57, 57' (FIGS. 1, 5 and 6). The opposite end portions 59 and 59' of the discharge conduit 35 are foreshortened as indicated at 60 in FIG. 6 below the exit points of shafts 54, 54', 56 and 56' so that handles 55, 55', 57, and 57' can be rotated from the closed position shown in solid lines in FIGS. 5 and 6 engaging respective stops 61, 61', 62 and 62' into the upper open position shown in the upper dotted lines, and thus move valve elements 24 and 26 into the full open position.

End caps 63 and 63a are provided to cover the respective end portions 59 and 59' of discharge conduit 35. In the construction shown in Ser. No. 775,892 a lug 64 is welded to end caps 63 and 63a whereby if the handles 55, 55', 57 and 57' are not in the fully closed position the end cap 63 cannot be applied. Protrusion 64 will abut one or other of the handles as the cap is applied if they are not in the fully closed position. End caps 63 and 63a are held in place by slots 65, 66, provided in respective lugs 67 and 68 provided on either side of each end cap. Large headed bolts 70 are mounted on opposite sides of discharge conduit end portions 59, 59' by means of vertically spaced lugs 72 and 73 welded to or formed integrally with the discharge conduit. Bolts 70 include a large head such as an eye head 70a and a shank portion 71 which is externally threaded at 71a. See FIGS. 3 and 6.

As described in greater detail in application Ser. No. 844,666 filed Oct. 25, 1977, a locking member 74 (FIG. 3) extends within openings 72a and 73a. Locking member 74 includes a lower portion 75 having generally horizontal opening 75a which is internally threaded, and an upper locking portion 76 extending above lug 73. Locking portion 76 is formed generally in an inverted J shape 80 having a lower, generally horizontal, surface 82.

Handles 55, 55', 57 and 57' each include an inner portion 84 having a vertical surface 85 and a horizontal surface 86 located below surface 82 of locking portion 80 when the handle is in the horizontal position which corresponds to the fully closed position of valve element 24 or 26. Each of handles 55, 55', 57 and 57' includes a shank portion 88 and a gripping portion 90. These handles further include a longitudinally extending inclined portion 91 which is inclined upwardly at 92 and a short transverse portion 94 having an opening 96 through which the respective shaft 54, 54', 56 and 56' passes, held in place with a nut 98.

Figure 4:
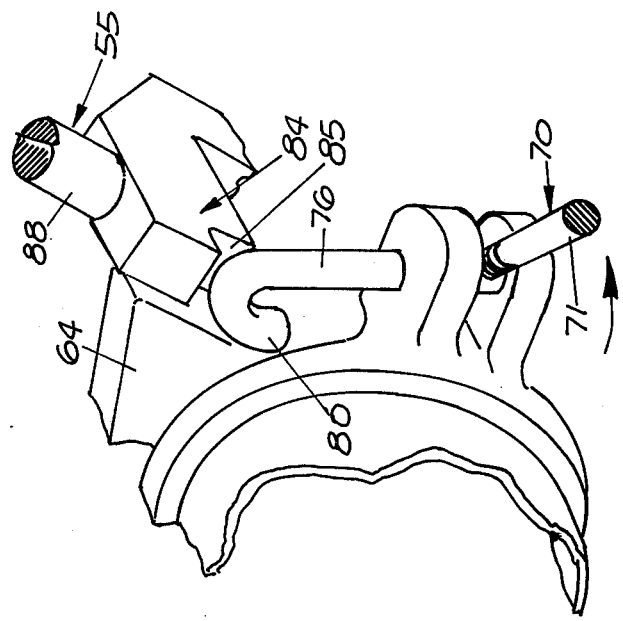
FIG. 4 is a perspective view similar to FIG. 3 illustrating the operating handle in an open position, providing an obstruction for the locking member.
Figure 3:
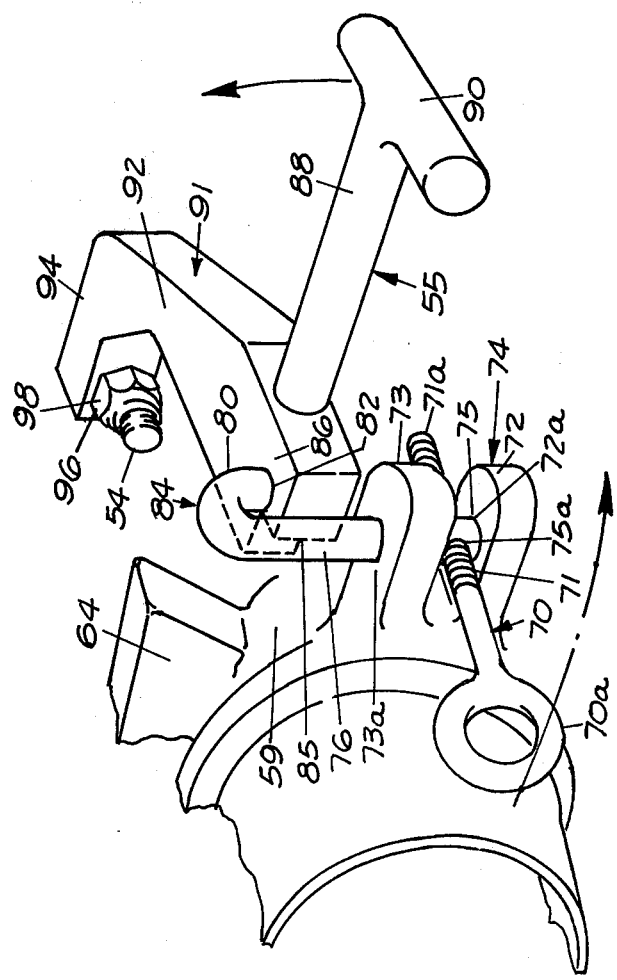
FIG. 3 is an enlarged perspective view of the end cap locking arrangement according to the teachings of Ser. No. 844,666 with the end cap removed, illustrating an operating handle in closed position and a locking member preventing movement of the operating handle from the closed position.

FIG. 3 shows the position of the handle 55 in the closed position with the lower surface 82 of locking portion 80 above surface 84 of handle 55, preventing rotation of handle 55 from the closed position. Large headed eye portion 70a passes through slot 65 and holds cap 63 in the closed position engaging lug 67 on discharge conduit end portion 59. See FIGS. 1 and 5.

If one of the handles 55 or 55', 57 or 57' is left in an open or partially open position, and the operator attempts to pivot bolts 70 into the closed position, handle portion 84 provides an obstruction for the locking portion 80 of locking member 74. Locking portion 80 will abut vertical surface 85 of handle portion 84, thus preventing the bolt 70 from assuming the closed position within the end cap slot 65 and/or 66.

To removed cap 63 to unload the lading, bolt 70 is rotated in the counterclockwise direction in FIG. 3 until bolts 70 are located out of slot 65 and/or 66 (FIG. 3) which also rotates locking portion 80 in the counterclockwise direction away from handle portion 84. A large headed bolt passing through slot 66 on the opposite side of the discharge conduit and its associated locking member pivot in the clockwise direction to remove cap 63. A pair of large headed bolts may also be located on the opposite end of the outlet covering discharge conduit portion 59, one or both provided with locking members constructed in the same manner as locking member 74.

The lading can then be unloaded by moving handles 55, 57′ and/or 55′, 57 to the open position shown in dotted lines in FIGS. 5 and 7 to move valve elements 24 and 26 to the open position, and/or the metering position shown in FIG. 2.

In the transport of some ladings it is desirable to move one of the valve elements 24 or 26 into a sampling position to take a sample of the lading. In the sampling position the valve element nearest the outlet end where the sample is to be taken is rotated into a position in which the body portion edge is spaced from the body portion valve seat, and the moment portion edge is spaced from the moment portion valve seat. Thus a portion of the lading will pass into the discharge tube, adjacent the outlet end where the sample is to be taken. The sample can then be removed manually by the operator. For example, if it is desired to take a sample from the far end of the outlet as shown in FIG. 1 the end cap 63a is removed as shown in half section in FIG. 6. Handle 55′ is then used to rotate valve element 26 to the sampling position shown in FIG. 7 in which body portion edge 46′ is spaced from shoulder 52 and moment portion edge 45′ is spaced from valve seat surface 51′.

As shown in FIG. 5, a locking member 174 includes an upper locking portion 176 having an inverted J shape portion 180 including a lower surface 182 which in closed position is vertically spaced from its respective locking handle 57′.

This handle 55 may be rotated from the sampling end of the outlet (FIG. 6) and valve element 26 moves toward the open position (FIG. 7) until handle 57′ (connected to valve element 26 through shaft 56′) abuts stop surface 182. Lading then passes into the discharge conduit. This lading can then be removed manually by the operator. Thus it is not necessary to got to the opposite end of the outlet, and for rail car application to the other side of the car, and remove cap 63 to take a sample from the far end of the outlet (FIG. 6).

Similarly on the end of the outlet adjacent end cap 63a, diagonally spaced from locking member 174, as shown in FIG. 6, a locking member 274 includes an upper locking portion 276 having an inverted J portion 280 having a lower surface 282 spaced above locking handle 57.

A sample can be taken by removing cap 63 and rotating handle 55 (FIG. 5) and valve element 24 until handle 57 (FIG. 6) abuts lower surface stop 282, which corresponds to the sampling position of valve element 24, similar to the sampling position of valve element 27 shown in FIG. 7, without going to the opposite end of the outlet and removing cap 63a. The sample may be removed manually, if desired, with a suitable scrapping tool.

This feature is particularly advantageous for rail car application where in some unloading sites it is difficult and/or inconvenient for the operator to move to the opposite side of the car to remove the end cap located on the opposite side of the car to take a sample.

What is claimed is:

1. A pneumatic outlet comprising: transversely spaced, longitudinally extending side walls having transversely spaced inner edges which define a lading opening; longitudinally spaced end walls attached to said side walls, a pneumatic discharge conduit located below said lading opening and extending outboard of said end walls; a pair of longitudinally spaced valve elements located within said outlet and adapted to open and close said lading opening; each valve element including a body portion having a body portion edge and a body portion valve seat located adjacent said body portion edge; in closed position said body portion edge seating on or adjacent to said body portion valve seat; each valve element further including a moment portion extending eccentrically and transversely away from said body portion, said moment portion having a moment portion edge; a moment portion valve seat located adjacent the moment portion edge; in closed position said moment portion edge seating on said moment portion valve seat; each valve element being movable to a sampling position in which said body portion edge is spaced from said body portion valve seat sufficient to allow lading to flow into the discharge conduit, and the moment portion edge is spaced from said moment portion valve seat sufficient to allow lading to flow into the discharge conduit; each valve element including a pair of operating shafts extending in opposite directions from the valve element, parallel to the discharge conduit and extending through opposite end walls of the outlet; operating handles attached to the operating shafts outside the end walls at each end of the outlet; removable end caps covering the discharge conduit at opposite ends of the outlet; each end cap held in place with a pair of large headed bolts pivotably mounted on opposite sides of the discharge conduit adjacent the ends thereof; said bolts engaging at least a portion of its respective end cap; said bolts attached to transversely spaced, vertically extending locking members of generally inverted J shape, rotatably mounted on each side of the discharge conduit, at each end of the outlet, whereby when said operating handles are in the position which corresponds to the fully closed position of the valve element, the lower surface of at least one locking member on each end of the outlet prevents movement of the respective operating handle and the valve element, from moving from the closed position, and whereby if the valve element and its operating handles are not in the fully closed position, the operating handles obstruct the path of the respective pivoting locking members and the large headed bolts cannot be pivoted into position to hold the end caps in closed position; a diagonally spaced pair of said J shaped locking members having their respective locking surfaces spaced from an adjacent surface of their respective locking handles a distance sufficient that when an end cap is removed from one end of the outlet, the operating shaft whose operating handle is spaced from the locking surface at the opposite end of the outlet may be rotated to move the valve element adjacent the sampling end to a sampling position without removing the end cap at the opposite end of the outlet.

2. An outlet according to claim 1 wherein the said spaced locking members constitute a sampling position stop for the valve element and operating shaft attached thereto.

3. A pneumatic outlet comprising: transversely spaced, longitudinally extending side walls having transversely spaced inner edges which define a lading opening; longitudinally spaced end walls attached to said side walls, a pneumatic discharge conduit located below said lading opening and extending outboard of said end walls; at least one valve element located within said outlet and adapted to open and close said lading opening; said valve element including a body portion having a body portion edge; a body portion valve seat located adjacent said body portion edge; in closed position said body portion edge seating on or adjacent to said body portion valve seat; said valve element further including a moment portion extending eccentrically and transversely away from said body portion, said moment portion having a moment portion edge; a moment portion valve seat located adjacent the moment portion edge; in closed position said moment portion edge seating on said moment portion valve seat; said valve element being movable to a sampling position in which said body portion edge is spaced from body portion valve seat to allow lading to flow into the discharge conduit, and the moment portion edge is spaced from said moment portion valve seat sufficient to permit lading to flow into the discharge conduit; said valve element including a pair of operating shafts extending in opposite directions from the valve element, parallel to the discharge conduit and extending through opposite end walls of the outlet; operating handles attached to the operating shafts outside the end walls at each end of the outlet; removable end caps covering the discharge conduit at opposite ends of the outlet; each end cap held in place with at least one large headed bolt pivotably mounted on opposite sides of the discharge conduit adjacent the ends thereof; said bolts engaging at least a portion of its respective end cap; said bolts attached to a vertically extending locking member of generally inverted J shape rotatably mounted on a side of the discharge conduit, at each end of the outlet, whereby when said operating handle is in the position which corresponds to the fully closed position of the valve element, the locking surface of the locking member on each end of the outlet prevents movement of the respective operating handle and the valve element from moving from the closed position, and whereby if the valve element and its operating handles are not in the fully closed position, the operating handles obstruct the path of the respective pivoting locking members and the large headed bolts attached to the respective locking members cannot be pivoted into position to hold the end caps in closed position; at least one of said J shaped locking members having its locking surface spaced from the adjacent surface of its respective locking handle a distance sufficient that when an end cap is removed from a sampling end of the outlet, the operating shaft whose operating handle is spaced from the locking surface at the opposite end of the outlet, may be rotated to move the valve element adjacent the sampling end to a sampling position without removing the end cap at the opposite end of the outlet.

4. An outlet according to claim 3 wherein the said spaced locking member constitutes a sampling position stop for the valve element and operating shaft attached thereto.

5. A pneumatic outlet comprising: transversely spaced, longitudinally extending side walls having transversely spaced inner edges which define a lading opening; longitudinally spaced end walls attached to said side walls, a pneumatic discharge conduit located below said lading opening and extending outboard of said end walls; at least one valve element located within said outlet and movable between open and closed positions relative to said lading opening; in open position allowing lading to flow into said discharge conduit, and in closed position preventing lading from entering said discharge conduit; said valve element being movable to a sampling position to allow lading to flow into said discharge conduit; a pair of operating shafts attached to said valve element and extending in opposite directions from said valve element, generally parallel to the discharge conduit and extending beyond the opposite end walls of the outlet; operating handles attached to the respective operating shafts outside the end walls at each end of the outlet; removable end caps covering the discharge conduit at opposite ends of the outlet; each end cap held in place with at least one large headed fastener pivotably mounted on a side of the discharge conduit adjacent one end thereof; said fastener engaging at least a portion of its respective end cap; said fastener attached to a locking member of generally inverted J shape rotatably, mounted on said side of the discharge conduit at at least one end of the outlet, whereby when said operating handles are in the position which corresponds to the fully closed position of the valve element, a locking surface of said locking member on said one end of the outlet prevents movement of its operating handle and valve element from moving from the closed position, and whereby if the valve element and its operating handle are not in the fully closed position, the operating handle obstructs the path of the pivoting locking member and the large headed fastener cannot be pivoted into position to hold the end cap in closed position; at one end of the outlet said J shaped locking member having its locking surface spaced from a surface of its respective locking handle a distance sufficient that when an end cap is removed from the sampling end of the outlet, said operating shaft may be rotated to move the valve element adjacent the sampling end to a sampling position without removing the end cap at said one end of the outlet.

6. An outlet according to claim 5 wherein said spaced locking member constitutes a sampling position stop for the valve element and operating shaft attached thereto.

* * * * *